United States Patent
Shi et al.

(10) Patent No.: US 10,015,780 B2
(45) Date of Patent: Jul. 3, 2018

(54) CONTROL CHANNEL TRANSMISSION, TRANSMISSION PROCESSING METHOD AND APPARATUS, NETWORK SIDE DEVICE AND TERMINAL

(71) Applicant: ZTE Corporation, Shenzhen (CN)

(72) Inventors: Jing Shi, Shenzhen (CN); Bo Dai, Shenzhen (CN); Shuqiang Xia, Shenzhen (CN); Xincai Li, Shenzhen (CN); Huiying Fang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 179 days.

(21) Appl. No.: 14/761,032

(22) PCT Filed: Sep. 10, 2013

(86) PCT No.: PCT/CN2013/083246
§ 371 (c)(1),
(2) Date: Nov. 9, 2015

(87) PCT Pub. No.: WO2014/110907
PCT Pub. Date: Jul. 24, 2014

(65) Prior Publication Data
US 2016/0081065 A1 Mar. 17, 2016

(30) Foreign Application Priority Data
Jan. 15, 2013 (CN) .......................... 2013 1 0014370

(51) Int. Cl.
*H04L 5/00* (2006.01)
*H04W 72/04* (2009.01)
(Continued)

(52) U.S. Cl.
CPC ............. *H04W 72/042* (2013.01); *H04L 1/08* (2013.01); *H04L 5/0053* (2013.01);
(Continued)

(58) Field of Classification Search
CPC . H04L 5/0053; H04L 25/0224; H04L 5/0048; H04L 5/0055; H04L 5/0057; H04W 52/146; H04W 52/325
See application file for complete search history.

(56) References Cited

U.S. PATENT DOCUMENTS

2009/0196247 A1* 8/2009 Fan .................. H04L 5/0053
370/329
2012/0263135 A1* 10/2012 Ahmadi ............. H04L 5/0007
370/329
(Continued)

FOREIGN PATENT DOCUMENTS

| CN | 101146279 A | 3/2008 |
|---|---|---|
| CN | 102413576 A | 4/2012 |
| WO | 2010124717 A1 | 11/2010 |

OTHER PUBLICATIONS

International Search Report for corresponding application PCT/CN2013/083246 filed Sep. 10, 2013; dated Feb. 27, 2014.
(Continued)

*Primary Examiner* — Raj Jain
(74) *Attorney, Agent, or Firm* — Cantor Colburn LLP

(57) ABSTRACT

A method and an apparatus for transmitting a control channel, a method and an apparatus for processing the transmission of the control channel, a network side device and a terminal are provided. The method for transmitting the control channel is applied to the network side device. The method for transmitting the control channel includes: acquiring indicating information for indicating a terminal type; and when the indicating information indicates that the terminal type is a first terminal type, transmitting the control channel to the terminal with the first terminal type in multiple sub-frames.

20 Claims, 5 Drawing Sheets

(51) Int. Cl.
*H04W 74/08* (2009.01)
*H04L 1/08* (2006.01)
(52) U.S. Cl.
CPC ......... *H04L 5/0055* (2013.01); *H04W 72/048* (2013.01); *H04W 74/0833* (2013.01); *H04L 5/0057* (2013.01)

(56) References Cited

U.S. PATENT DOCUMENTS

2013/0182654 A1* 7/2013 Hariharan ............. H04W 52/54 370/329
2016/0081065 A1* 3/2016 Shi ...................... H04W 72/048 370/329

OTHER PUBLICATIONS

European Search Report Application No. 13872109.7; dated Dec. 17, 2015; pp. 9.
Catt: "Analysis of coverage improvement for low-cost MTC LTE Uess", 3GPP Draft; R1-125247, 3rd Generation Partnership Project (3GPP), Mobile Competence Centre; vol. RAN WG1, No. New Orleans; USA; 20121112-20121116; Nov. 15, 2012, XP050663126, Retrieved From the Internet; URL;http://www.3gpp.org/ftp/tsg_ran/wg1_rg1/tsgr1_7t/docs/ [Retrieved on Nov. 15, 2012].
Huawei, et al. Solutions on Coverage Improvement for Low Cost MTC, 3GPP Draft; RI-124705, 3rd Generation Partnership Project (3GPP), Mobile Competence Centre; 650, Route Des Lucioles; F-06921, vol. Nov. 3, 2012, XP050662749, URL; http/www.3gpp.org/ftp/tsg_ran/wg1_rg1/tsgr1_71/docs/ [Retrieved on Nov. 3, 2012].
Huawei, et al,"Text Proposal for TR 36.88 on Coverage Improvement", 3GPP Draft; RI24704, 3rd Generation Partnership Project (3GPP), Mobile Competence Centre; 650, Route Des Lucioles; F-06921, vol. Nov. 3, 2012, XP050662748, URL; http//www.3gpp.org/ftp/tsg_ran/wg1_rl1/tsgr_71/docs/ [Retrieved on Nov. 3, 2012].
LG Electronics: "Discussion on Coverage Enhancement for a low-cost MTC UE" 3GPP Draft; RI-124993 (MTC_Coverage_Enhancement_LG), 3rd Generation Partnership Project (3GPP), vol. Ran WG1, No. New Orleans, USA 2012 20121112-20121116, Nov. 3, 2012, XP050662906, Retrieved from the Internet: URL:http:www.3gpp.org/ftp/tsg_ran/wg1_rg1/tsgr1_7t/docs/ [retrieved on Nov. 3, 2012].
Vodafone: "RAN Mechanisms to Distribute Rach Intersity" 3GPP Draft: R2-102297, 3rd Generation Partnership Project(3GPP), Mobile Competence Centre; 650 Rouse Des Lucioles; F-06921 Sophia-Antipolis Cedex; France, vol. RAN WG2, No. Beijing, China; 20100412, April 5, 2010; XP050422461 [retrieved on Apr. 5, 2010].
Examination Report No. 13 872 109.7; dated Jan. 1, 13, 2017, pp. 2.

* cited by examiner

CONTROL CHANNEL TRANSMISSION, TRANSMISSION PROCESSING METHOD AND APPARATUS, NETWORK SIDE DEVICE AND TERMINAL

TECHNICAL FIELD

The embodiments of the disclosure relate to the field of communications, in particular to a method and an apparatus for transmitting a control channel, a method and an apparatus for processing the transmission of the control channel.

BACKGROUND

The Machine Type Communication (MTC) User Equipment (UE or terminal), which is also called Machine to Machine (M2M) user communication equipment, is a main application form of the current Internet of things. In recent years, due to the high spectrum efficiency of the Long Term Evolution (LTE) system/Long-Term Evolution Advance (LTE-Advance or LTE-A) system, more and more mobile operators select the LTE/LTE-A as an evolution direction of the broadband wireless communication system. Various MTC data services based on the LTE/LTE-A may also become more attractive.

The conventional LTE/LTE-A system carries out transmission based on the dynamic scheduling of each sub-frame, and its frame structure is as shown in FIGS. 1 and 2.

FIG. 1 is a diagram illustrating a frame structure in a Frequency Division Duplexing (FDD) mode according to relevant art. As shown in FIG. 1, a wireless frame of 10 ms consists of twenty time slots of 0.5 ms (the numbers of which are 0 to 19), and time slots 2i and 2i+1 form a sub-frame i of 1 ms, where i is a natural number.

FIG. 2 is a diagram illustrating a frame structure in a Time Division Duplexing (TDD) mode according to relevant art, as shown in FIG. 2, a wireless frame of 10 ms consists of two half frames of 5 ms, wherein a half frame includes five sub-frames of 1 ms, and sub-frame i is pre-defined as two slots of 0.5 ms, (2i) and (2i+1).

A Physical Downlink Control Channel (PDCCH) and an enhanced Physical Downlink Control Channel (ePDCCH) are defined in the LTE/LTE-A system. The information carried in a Physical Control Format Indicator Channel (PDFICH) is used for indicating the number of Orthogonal Frequency Division Multiplexing (OFDM) symbol for transmitting the PDCCH in one sub-frame. The Physical Hybrid Automatic Repeat-reQuest Indicator Channel (PHICH) is used for carrying the Acknowledgement/Negative Acknowledgement (ACK/NACK) feedback information of uplink transmission data.

The PDCCH is used for carrying Downlink Control Information (DCI), which includes: uplink/downlink scheduling information and uplink power control information.

The MTC can acquire the DCI by demodulating the PDCCH/ePDCCH, so as to demodulate and control a Physical Downlink Share Channel (PDSCH) and a Physical Uplink Share Channel (PUSCH).

In the MTC, there is a type of terminal, the coverage performance of which is reduced obviously due to the limitation of location or characteristics of itself. Therefore, this terminal needs a special coverage enhancing measure when it is in a low coverage environment. For the repeated transmission for a synchronous channel and service data in a time domain, namely, a plurality of sub-frames transmit the same information, energy accumulation at a receiving end is an effective solution for the coverage problem. At present, a downlink control channel does not support the repeated transmission in the time domain yet.

For the problem in the relevant art, there is still no effective solution yet.

SUMMARY

To solve the technical problems that a downlink control channel cannot be transmitted repeatedly and the like in the related arts, embodiments of the disclosure provide a method and an apparatus for transmitting a control channel, a method and an apparatus for processing the transmission of the control channel, a network side device and a terminal.

According to an embodiment of the disclosure, a method for transmitting a control channel is provided and is applied to a network side device. The method includes: indicating information for indicating a terminal type is acquired; and when the indicating information indicates that the terminal type is a first terminal type, the control channel is transmitted to the terminal with the first terminal type in multiple sub-frames.

In an example embodiment, the method further includes: when the indicating information indicates that the terminal type is a second terminal type, the control channel is transmitted to the terminal with the second terminal type in a single sub-frame.

In an example embodiment, the step that indicating information for indicating a terminal type is acquired includes at least one of the following steps: the indicating information is acquired according to Physical Random Access Channel (PRACH) information corresponding to the terminal; and the indicating information is acquired according to the location information of the terminal.

In an example embodiment, the step that indicating information is acquired according to PRACH information corresponding to the terminal includes: the terminal type is determined according to the PRACH information corresponding to the terminal, wherein the PRACH information corresponding to the first terminal type and the second terminal type are different.

In an example embodiment, before the indicating information is acquired according to the PRACH information corresponding to the terminal, the method includes: the terminal type is determined according to PRACH resources corresponding to the terminal, wherein the PRACH resources corresponding to the first terminal type and the second terminal type are different.

In an example embodiment, before the indicating information is acquired according to the location information of the terminal, the method includes: the terminal type is determined according to a designated location area in a cell where the terminal is located, wherein the designated location areas corresponding to the first terminal type and the second terminal type are different.

In an example embodiment, the method further includes: a bit number of DCI of the first terminal type is not more than a bit number of DCI of the second terminal type.

In an example embodiment, the method further includes: in a same transmission mode, the DCI corresponding to the control channel transmitted in multiple sub-frames is different from that transmitted in a single sub-frame.

In an example embodiment, the type of the control channel is determined in one of the following ways: the type of the control channel to be adopted is determined according to the bandwidth of an LTE system; the type of the control channel to be adopted is determined according to a carrier type; a designated type of the control channel is adopted regularly; and the type of the control channel is configured by a high-layer signalling.

In an example embodiment, the control channel includes a PDCCH and an ePDCCH.

When the terminal type indicated by the indicating information is the first terminal type, the step that the type of the control channel to be adopted is determined according to the bandwidth of an LTE system includes: when the bandwidth is equal to a designated threshold, the PDCCH is adopted, and when the bandwidth is larger than the designated threshold, the ePDCCH is adopted; and the step that the type of the control channel to be adopted is determined according to a carrier type includes: the PDCCH is adopted in case of a non New Carrier Type (NCT) and the ePDCCH is adopted in case of an NCT; and the ePDCCH is adopted regularly.

When the terminal type indicated by the indicating information is the second terminal type, the step that the type of the control channel to be adopted is determined according to the bandwidth of an LTE system includes: when the bandwidth is equal to a designated threshold, the PDCCH or the ePDCCH is adopted, and when the bandwidth is larger than the designated threshold, the ePDCCH is adopted; and the step that the type of the control channel to be adopted is determined according to a carrier type includes: the PDCCH is adopted in case of a non NCT and the ePDCCH is adopted in case of an NCT; and the PDCCH is adopted regularly; and the ePDCCH is detected regularly.

In an example embodiment, when the control channel is transmitted to the terminal with the first terminal type in multiple sub-frames, the method further includes: a data channel scheduled by the control channel and/or an uplink control channel corresponding to the control channel are transmitted in the sub-frames.

In an example embodiment, the number of repetition of the data channel or the uplink control channel is determined by one of the following ways: the number of repetition of the data channel or the uplink control channel is in a corresponding relationship with that of the control channel; the number of repetition is indicated through the control information in the control channel; and a pre-defined number of repetition is adopted.

In an example embodiment, the timing relationship between the data channel and the control channel includes: a downlink data channel and the control channel are transmitted in same one or more sub-frames; or, the data channel is transmitted after the control channel and there are T sub-frames between the data channel and the control channel, where T is 0 or a positive integer.

In an example embodiment, the resources corresponding to the control channel are determined in the following ways: the sub-frames transmitted in a bundling way are determined according to a pre-defined way or a signalling-indicated way, wherein the bundling transmission refers to the repeated transmission of the control channel in a time domain; and the location of resources for the bundling transmission of the control channel is determined.

In an example embodiment, the step that the sub-frames transmitted in a bundling way are determined according to a pre-defined way includes: the following ways are pre-defined to be adopted in the time domain: each wireless frame utilizes h sub-frames and M wireless frames are configured, where h and M are natural numbers.

In an example embodiment, h is one of the following numbers: 1, 2, 3, 4, 5, 6, 7, 8, 9 and 10.

In an example embodiment, bundling continuous N sub-frames, where N is a natural number, and the number and location of OFDM symbols utilized by each of the N sub-frames are the same; or, the N sub-frames are bundled at an interval of a designated number of sub-frames.

In an example embodiment, when adopting the bundling way of bundling continuous N sub-frames, N is one of the following numbers: 4, 8, 10, 16, 20, 30, 40, 50, 60, 80, 100, 200 and 400.

In an example embodiment, the sub-frames transmitted in a bundling way are determined by one of the following signalling-indicated ways: the sub-frames are indicated by a Main Information Block, MIB, message; the sub-frames are indicated by N bit carried in reserved sub-carriers on the two sides of a primary synchronization sequence or a secondary synchronization sequence, where N is a natural number; after a Radio Resource Control (RRC) connection is established, the sub-frames are notified by an RRC signalling; and the sub-frames are indicated by a signalling in a Random Access Channel (RACH) process.

In an example embodiment, the step that The location of resources for the bundling transmission of the control channel is determined includes: the location of resources is determined in one of the following ways for the PDCCH: the PDCCH is transmitted repeatedly on a Control Channel Element (CCE) of a same index of respective bundled sub-frames; the PDCCH is transmitted repeatedly in a candidate set of a same index in special search spaces of respective bundled sub-frames; and the PDCCH is transmitted repeatedly in the special search space in a pre-defined aggregation level of respective bundled sub-frames.

In an example embodiment, the step that the sub-frames transmitted in a bundling way are determined according to a pre-defined way includes: when the control channel is the ePDCCH, the sub-frames are determined in one of the following ways: all the bundled sub-frames are transmitted on a same Physical Resource Block (PRB); the frequency domain locations of the repeated sub-frames implement frequency hopping in a same set with respect to that of the original sub-frame; and the frequency domain locations of the repeated sub-frames implement frequency hopping in a different set with respect to that of the original sub-frame.

In an example embodiment, the step that The location of resources for the bundling transmission of the control channel is determined includes one of the following steps: when the control channel is the ePDCCH, the ePDCCH is transmitted repeatedly on the enhanced Control Channel Element (eCCE) of a same index of respective bundled sub-frames; the ePDCCH is transmitted repeatedly in a same index candidate set of a same PRB set of respective bundled sub-frames; the ePDCCH is transmitted in a same eCCE in a pre-defined aggregation level in a PRB corresponding to respective bundled sub-frames, wherein a same candidate set index exists in a same PRB set; and the ePDCCH is transmitted repeatedly on an eCCE corresponding to a same candidate set index in different PRB sets of respective bundled sub-frames.

In an example embodiment, a corresponding encoding method for data scheduled by information carried by the control channel or a corresponding encoding method for information carried by the control channel includes one of the following steps: a threshold X is pre-defined, when the bit number of information of a transmission block is less than the threshold X, an Tail Biting Convolutional code (TBCC) is adopted; otherwise, a turbo code is adopted, wherein X is a natural number; and two thresholds X and Y are pre-defined, when the bit number of information of the transmission block is more than or equal to X, a turbo code is adopted, when the bit number of information of the transmission block is more than or equal to Y and is less than X, a TBCC is adopted, and when the bit number of information of the transmission block is less than Y, a Reed-Muller (RM) code is adopted, wherein X and Y are both natural numbers and X>Y.

In an example embodiment, a corresponding Cyclic Redundancy Check (CRC) determining method for the data scheduled by the information carried in the control channel or the method for determining CRC corresponding to the information carried in the control channel includes one of the following steps: a threshold X1 is pre-defined, when the bit number of information of the transmission block is less than X1, CRC with A1 bits is added, otherwise, CRC with A2 bit is added, wherein A1 and A2 are positive integers, and X1 is a natural number; and two thresholds X1 and Y1 are pre-defined, when the bit number of information of the transmission block is more than or equal to X1, CRC with B2 bits is added, when the bit number of information of the transmission block is more than or equal to Y1 and is less than X1, CRC with B2 bits is added, and when the bit number of information of the transmission block is less than Y1, CRC with B3 bits is added, wherein X1 and Y1 are both natural numbers and X1>Y1.

In an example embodiment, (A1, A2) is one of the following sets: (8, 16), (16, 24), (8, 24) and (4, 16); and/or (B1, B2, B3) is one of the following sets: (24, 16, 8) and (16, 8, 4).

According to another embodiment of the disclosure, a method for processing the transmission of a control channel is provided and is applied to a terminal. The method includes: indicating information for indicating a terminal type is acquired; and when the indicating information indicates that the terminal type is a first terminal type, the control channel is detected in multiple sub-frames.

In an example embodiment, the method further includes: when the indicating information indicates that the terminal type is a second terminal type, the control channel is detected in a single sub-frame.

In an example embodiment, the step that indicating information for indicating a terminal type is acquired includes at least one of the following steps: the indicating information is acquired according to PRACH information corresponding to the terminal; and the indicating information is acquired according to the position information of the terminal.

In an example embodiment, before the indicating information is acquired according to the PRACH information corresponding to the terminal, the method includes: the terminal type is determined according to the PRACH information corresponding to the terminal, wherein the PRACH information corresponding to the first terminal type and the second terminal type are different.

In an example embodiment, before the indicating information is acquired according to the PRACH information corresponding to the terminal, the method includes: the terminal type is determined according to PRACH resources corresponding to the terminal, wherein the PRACH resources corresponding to the first terminal type and the second terminal type are different.

In an example embodiment, before the indicating information is acquired according to the location information of the terminal, the method includes: the terminal type is determined according to a designated location area in a cell where the terminal is located, wherein the designated location areas corresponding to the first terminal type and the second terminal type are different.

In an example embodiment, the method further includes: it is determined that the control channel carries information through DCI in different formats according to different bandwidths of the LTE system.

In an example embodiment, a compact DCI format is utilized when a plurality of frames are repeated. In the compact DCI format, a bit domain can be further added, in an example embodiment, the number of repetition of an indicator service channel is added (for example, 2 bit information, the number of repetition of the indicator service channel is added in the DCI, which is preferably selected from the set {10, 20, 30, 50}).

In an example embodiment, the type of the control channel is determined in one of the following ways: a designated type of the control channel is detected according to the bandwidth of the LTE system; the detected designated type of the control channel is determined according to a carrier type; and the designated type of the control channel is detected regularly.

In an example embodiment, the control channel includes a PDCCH and an ePDCCH.

When the terminal type indicated by the indicating information is the first terminal type, the step that a designated type of the control channel is detected according to the bandwidth of the LTE system includes: when the bandwidth is equal to a designated threshold, the PDCCH is detected, and when the bandwidth is larger than the designated threshold, the ePDCCH is detected; and the step that the detected designated type of the control channel is determined according to a carrier type includes: the PDCCH is detected by a compatible carrier and the ePDCCH is detected by a non-compatible carrier; and the ePDCCH is detected regularly.

When the terminal type indicated by the indicating information is the second terminal type, the step that a designated type of the control channel is detected according to the bandwidth of the LTE system includes: when the bandwidth is equal to a designated threshold, the PDCCH or the ePDCCH is detected, and when the bandwidth is larger than the designated threshold, the ePDCCH is detected; and the step that the detected designated type of the control channel is determined according to a carrier type includes: the PDCCH is detected by a compatible carrier and the ePDCCH is detected by a non-compatible carrier; and the ePDCCH is detected regularly.

In an example embodiment, the method further includes: when the control channel is detected in multiple sub-frames, the terminal determines the location of a data channel scheduled by the control channel according to the location of the control channel; and the data channel and the control channel are transmitted in same one or more sub-frames.

In an example embodiment, the timing relationship between the data channel and the control channel includes: the data channel is transmitted after the control channel and there are T sub-frames between the data channel and the control channel, where T is 0 or a positive integer.

In an example embodiment, the resources corresponding to the control channel are determined in the following ways: the sub-frames transmitted in a bundling way are received according to a pre-defined way or a signalling-indicated way; and the location of resources for the bundling transmission of the control channel is determined.

In an example embodiment, the step that the sub-frames transmitted in a bundling way are determined according to a pre-defined way includes: the following ways are pre-defined to be adopted in a time domain: each wireless frame utilizes h sub-frames and M wireless frames are configured, where h and M are natural numbers.

In an example embodiment, h is one of the following numbers: 1, 2, 3, 4, 5 or 6.

In an example embodiment, adopting the bundling way of bundling continuous N sub-frames, where N is a natural number, and the number and location of OFDM symbols utilized by each of the N sub-frames are the same; or, N sub-frames are bundled at an interval of a designated number of sub-frames.

In an example embodiment, when the bundling way of bundling continuous N sub-frames is adopted, N is one of the following numbers: 4, 8, 10 and 20.

In an example embodiment, a signalling-indicated way is received to acquire indicated bundling transmission information in one of the following ways: the indicated bundling transmission information is acquired by receiving an MIB message of a main system information block; the indicated bundling transmission information is acquired by receiving a designated bit carried in reserved sub-carriers on the two sides of a primary synchronization sequence or a secondary synchronization sequence; after an RRC connection is established, an RRC signalling is received to acquire the indicated bundling transmission information; and the indicated bundling transmission information is determined according to a signalling in an RACH process.

In an example embodiment, the step that The location of resources for the bundling transmission of the control channel is determined includes: for a PDCCH, the location of resources is determined in one of the following ways: for the PDCCH, the way for detecting the time and frequency domains of the PDCCH in each sub-frame is invariable; and the PDCCH is detected blindly in a special search space in a pre-defined aggregation level X in respective sub-frames, wherein X is a natural number.

In an example embodiment, the step that the sub-frames transmitted in a bundling way are determined according to a pre-defined way includes: when the control channel is an ePDCCH, the sub-frame is determined in one of the following ways: all the bundled sub-frames are transmitted in a same PRB; the frequency domain locations of the repeated sub-frames implement frequency hopping in a designated set with respect to that of the original sub-frame; and the frequency domain locations of the repeated sub-frames implement frequency hopping in a different set with respect to that of the original sub-frame.

In an example embodiment, when the control channel is the ePDCCH, the step that The location of resources for the bundling transmission of the control channel is determined includes at least one of the following steps: the ePDCCH is detected blindly in a same PRB set in a pre-defined aggregation level in respective sub-frames; and the ePDCCH is detected blindly in different PRB sets according to the serial numbers of the bundled sub-frames in respective sub-frames.

According to another embodiment of the disclosure, an apparatus for transmitting a control channel is further provided and is applied to a network side device. The apparatus includes: an acquisition component which is configured to acquire indicating information for indicating a terminal type, and a transmission component which is configured to, when the indicating information indicates that the terminal type is a first terminal type, transmit the control channel to the terminal with the first terminal type in multiple sub-frames.

In an example embodiment, the transmission component is further configured to, when the indicating information indicates that the terminal type is a second terminal type, transmit the control channel to the terminal with the second terminal type in a single sub-frame.

According to another embodiment of the disclosure, a network side device is provided, including the transmission apparatus above.

According to another embodiment of the disclosure, an apparatus for processing the transmission of a control channel is provided and is applied to a terminal. The apparatus includes: an acquisition component which is configured to acquire indicating information for indicating a terminal type; and a detection component which is configured to, when the indicating information indicates that the terminal type is a first terminal type, detect the control channel in multiple sub-frames.

In an example embodiment, the detection component is further configured to: when the indicating information indicates that the terminal type is a second terminal type, detect the control channel in a single sub-frame.

According to another embodiment of the disclosure, a terminal is provided, including the processing apparatus above.

Through the embodiments, the technical means that the control channel is transmitted to the terminal in multiple sub-frames when the indicating information indicates that the terminal type is the first terminal type is adopted to solve the technical problems that the downlink control channel cannot be transmitted repeatedly and the like in the related arts, so that a network side can distinguish the terminal in a low-coverage environment to transmit the control channel, and the terminal which demands coverage promotion can be ensured to receive control information from a base station correctly, thereby ensuring the data transmission of the terminal.

BRIEF DESCRIPTION OF THE DRAWINGS

The drawings illustrated here are to provide further understanding of the disclosure and constitute one part of the application, and the exemplary embodiments of the disclosure and the explanations thereof are intended to explain the disclosure, instead of improperly limiting the disclosure. In the drawings.

DETAILED DESCRIPTION OF THE EMBODIMENTS

The embodiments of the disclosure will be described below with reference to the drawings and in combination with the embodiments in detail. It should be noted that, in case of no conflict, the embodiments of the application and features therein can be combined with one another.

Embodiment 1

Figure 1:
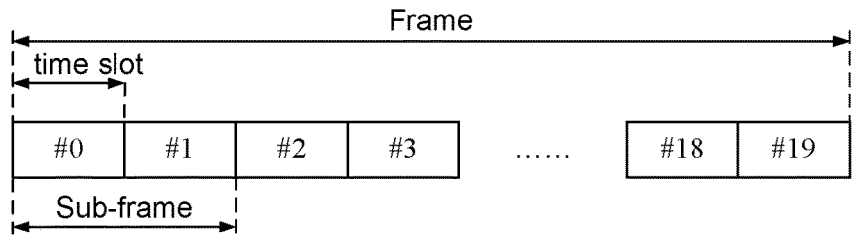
FIG. 1 is a diagram illustrating the structure of an FDD frame in an LTE system according to related arts.
Figure 2:
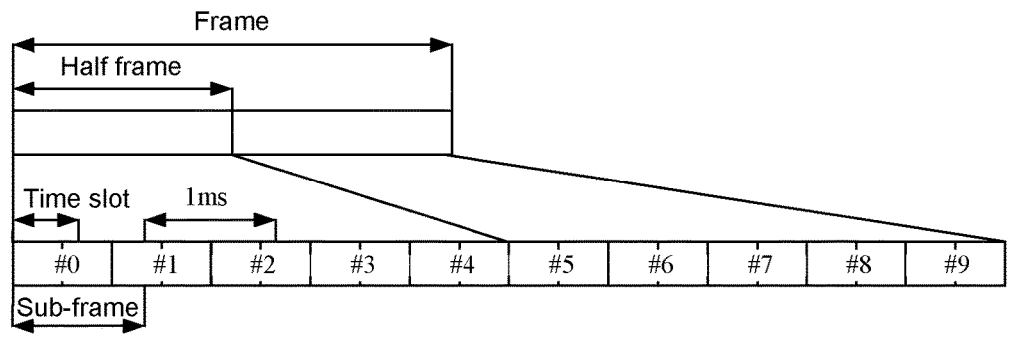
FIG. 2 is a diagram illustrating the structure of a TDD frame in an LTE system according to related arts.
Figure 3:
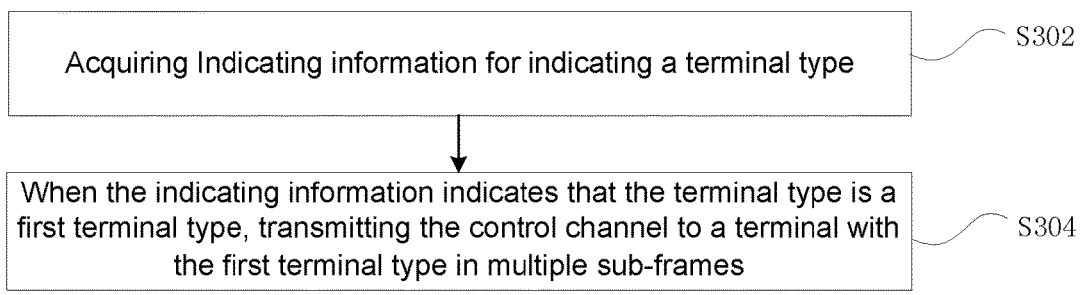
FIG. 3 is a flowchart of a method for transmitting a control channel according to embodiment 1 of the disclosure.

FIG. 3 is a flowchart of a method for transmitting a control channel according to an embodiment of the disclosure. The method is applied to a network side device, as shown in FIG. 3, including:

Step 302: Indicating information for indicating a terminal type is acquired.

Step 304: When the indicating information indicates that the terminal type is a first terminal type, the control channel is transmitted to a terminal with the first terminal type in multiple sub-frames.

Through the steps above, the technical means that the control channel is transmitted to the terminal in multiple sub-frames when the terminal type indicated by the indicating information for indicating the terminal type is the first terminal type is adopted, so that a network side can distinguish the terminal in a low-coverage environment to transmit the control channel, and the terminal which demands coverage promotion can be ensured to receive control information from a base station correctly, thereby ensuring the data transmission of the terminal.

In Step 302, the indicating information can be acquired in various ways: for example, the indicating information can be acquired locally: a base station configures partial areas regularly to transmit the control channel repeatedly; and the indicating information may be acquired from a third party.

In the embodiment, when the indicating information indicates that the terminal type is a second terminal type, the control channel is transmitted to the terminal with the second terminal type in a single sub-frame.

In the embodiment, the terminal type may be identified by 1 or 2. For example, "1" represents the first terminal type, and "2" represents the second terminal type.

The specific way for acquiring the indicating information for indicating the terminal type includes but is not limited to one of the following ways:

(1) the indicating information is acquired according to PRACH information corresponding to the terminal; and (2) the indicating information is acquired according to the location information of the terminal.

The first way can be implemented by the following ways:

a, the terminal type is determined according to PRACH information corresponding to the terminal, wherein the PRACH information corresponding to the first terminal type and the second terminal type are different. An existing LTE terminal access way is utilized as the first terminal type, and a way different from the existing LTE terminal access way is utilized as the second terminal type; and b, the terminal type is determined according to PRACH resources corresponding to the terminal, wherein the PRACH resources corresponding to the first terminal type and the second terminal type are different. In the embodiment, the PRACH resources may include one of the following resources: PRACH preamble sequences, PRACH time-domain resources and PRACH frequency-domain resources.

The first way may also be implemented by the following ways:

the terminal type is determined according to a designated location area in a cell where the terminal is located, wherein the designated location areas corresponding to the first terminal type and the second terminal type are different. When the network side device is a base station, the terminal type is determined as the base station according to the location of the terminal and the network side device is configured to transmit the control channel repeatedly in multiple frames to the terminal in a fixed location in the cell, and it may be controlled by the horizontal transmission angle and the vertical transmission angle of the base station.

In the embodiment, the bit number of DCI of the first terminal type is not more than that of the second terminal type.

In the embodiment, a method for determining information carried in the control channel specifically includes:

In case of the dynamic scheduled transmission of each sub-frame of the control channel, according to a system bandwidth, when BW=1.4 MHz, a compact DCI format is utilized; and when BW>1.4 MHz, a format 0/1A in the LTE system is utilized, wherein the compact DCI format at least contains at least one of the following bit domains:

carrier indicator, format 0/1A identifier, frequency hopping identifier of PUSCH, resource allocator and frequency hopping allocator of PUSCH, Modulation Code Scheme (MCS) level and Redundancy Version (RV), New Data Indicator (NDI), Transmit Power Control (TPC) command for a scheduled PUSCH, cyclic shift and Orthogonal Cover Code (OCC) index of a Demodulation Reference Signal (DM RS), a UL index, a Downlink Assignment Index (DAI), a Channel State Information (CSI) request, a Sounding Reference Signal (SRS) request, a resource allocation type, a concentrated/dispersed Virtual Resource Block (VRB) allocation flag, a PDSCH resource allocator, a permeable index, a PRACH cover index, a Hybrid Automatic Repeat Request (HARQ) process number, an RV, and a TPC command for a scheduled PUCCH.

In case of the multi-frame bundling repetition of the control channel, according to a system bandwidth, when BW=1.4 MHz, a pre-defined DCI format is utilized; and when BW>1.4 MHz, a format 0/1A in the LTE system is utilized; (different DCI formats are utilized according to different bandwidths).

Besides the bit domain of the compact DCI format, a bit domain can be added to the DCI format in case of the multi-frame repetition. In an example embodiment, the number of repetition of an indicator service channel is added (for example, 2 bit information, the number of repetition of the indicator service channel is added in the DCI, which is preferably selected from the set {10, 20, 30, 50}).

In the embodiment, in a same transmission mode, the DCI corresponding to the control channel transmitted in multiple sub-frames is different from that transmitted in a single sub-frame.

In the embodiment, the way for determining the type of the control channel can include but is not limited to the following ways:

1, the type of the control channel to be adopted is determined according to the bandwidth of an LTE system;

2, the type of the control channel to be adopted is determined according to a carrier type;

3, a designated type of the control channel is adopted regularly; and 4, a control channel type is configured by a high-layer signalling.

In the embodiment, the control channel includes a PDCCH and an ePDCCH.

When the terminal type indicated by the indicating information is the first terminal type, the step that the type of the control channel to be adopted is determined according to the bandwidth of an LTE system includes: when the bandwidth is equal to a designated threshold, the PDCCH is adopted, and when the bandwidth is larger than the designated threshold, the ePDCCH is adopted (for example, when the bandwidth BW=1.4 MHz, the PDCCH is adopted; and when BW>1.4 MHz, the ePDCCH is adopted); and the step that the type of the control channel to be adopted is determined according to a carrier type includes: the PDCCH is adopted in case of a non NCT and the ePCCH is utilized in case of an NCT; and the ePDCCH is adopted regularly.

When the terminal type indicated by the indicating information is the second terminal type, the step that the type of the control channel to be adopted is determined according to the bandwidth of an LTE system includes: when the bandwidth is equal to a designated threshold, the PDCCH or the ePDCCH is adopted, and when the bandwidth is larger than the designated threshold, the ePDCCH is adopted (for example, when the bandwidth BW=1.4 MHz, the PDCCH or the ePDCCH is adopted; and when BW>1.4 MHz, the ePDCCH is adopted); and the step that the type of the control channel to be adopted is determined according to a carrier type includes: the PDCCH is adopted in case of a non NCT and the ePCCH is utilized in case of an NCT; the PDCCH is adopted regularly and the ePDCCH is adopted regularly.

In the embodiment, when the control channel is transmitted to a terminal with the first terminal type in multiple sub-frames, a data channel scheduled by the control channel and/or an uplink control channel corresponding to the control channel are transmitted in the sub-frames. Namely, when the control channel is transmitted in multiple sub-frames, the data channel (PDSCH/PUSCH) scheduled by the control channel and/or the uplink control channel corresponding to the control channel are/is also transmitted in the sub-frames.

In the embodiment, the number of repetition of the data channel or the uplink control channel is determined in one of the following ways: the number of repetition is in a corresponding relationship with that of the control channel above. For example, they are in a certain proportion relationship. A relatively special condition is that its number of repetition is the same as that of the control channel; the number of repetition is indicated by control information in the control channel; and a pre-defined number of repetition is adopted.

In the embodiment, the timing relationship between the data channel and the control channel includes:

a downlink data channel and the control channel are transmitted in same one or more sub-frames; or, the data channel is transmitted after the control channel and there are T sub-frames between the data channel and the control channel, where T is 0 or a positive integer. For the former, in case of no special indication (namely, the DCI contains the transmission time of the service channel) and a special pre-definition (namely, the service channel is transmitted according to a pre-defined sub-frame time), the data channel and the control channel are transmitted in a same bundled sub-frame.

When the control channel is transmitted in multiple sub-frames, the resources corresponding to the control channel are determined by the following ways:

Step 1: The sub-frames transmitted in a bundling way are determined according to a pre-defined way or a signalling-indicated way, wherein the bundling transmission refers to that the control channel is transmitted repeatedly in a time domain. Step 2: The location of resources for the bundling transmission of the control channel is determined.

Figure 4:
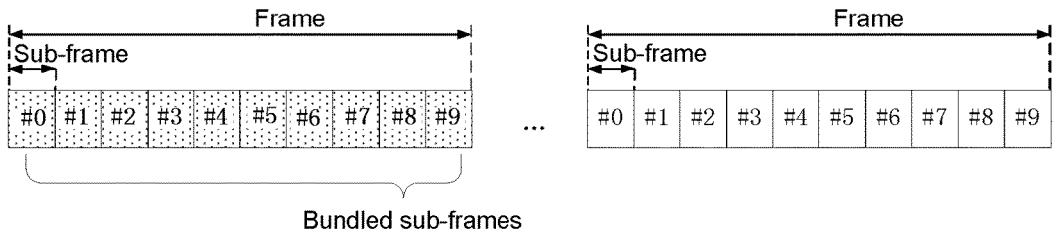
FIG. 4 is a diagram illustrating indicating bundling in a way pre-defined in a time domain according to embodiment 1 of the disclosure.
Figure 5:
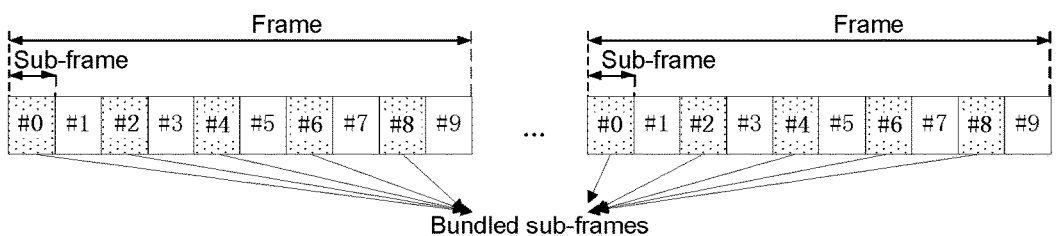
FIG. 5 is another diagram illustrating indicating bundling in a way pre-defined in a time domain according to embodiment 1 of the disclosure.
Figure 6:
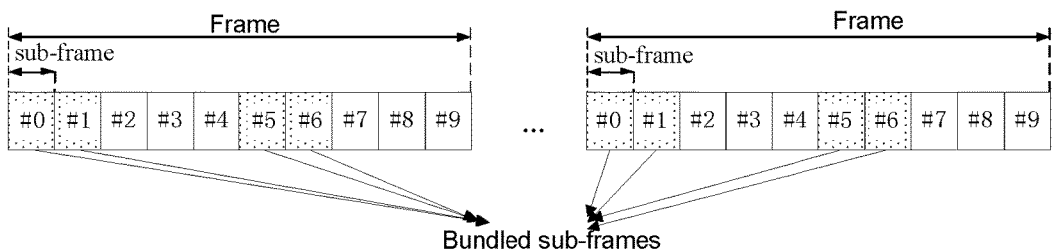
FIG. 6 is another diagram illustrating indicating bundling in a way pre-defined in a time domain according to embodiment 1 of the disclosure.

The step that the sub-frames transmitted in a bundling way are determined according to a pre-defined way, as shown in FIGS. 4 to 6, includes: the following ways are pre-defined to be adopted in the time domain: each wireless frame utilizes h sub-frames and M wireless frames are configured, where h and M are natural numbers. In an example embodiment, h is one of the following numbers: 1, 2, 3, 4, 5 and 6.

In the embodiment, continuous N sub-frames can be bundled, where N is a natural number, and the number and location of OFDM symbols utilized by each of the N sub-frames are the same; or, N sub-frames are bundled at an interval of a designated number of sub-frames. When the way of bundling continuous N sub-frames is adopted, N is one of the following numbers: 4, 8, 10 and 20.

In the embodiment, the sub-frames transmitted in a bundling way are determined in one of the following signalling-indicated ways:

1. The signalling-indicated way is indicated by an MIB message of a main system information block. For example, N bit is added in a 10 bit reserved bit, where N is a natural number.

2. The signalling-indicated way is indicated by N bit carried in reserved sub-carriers on the two sides of a primary synchronization sequence or a secondary synchronization sequence, where N is a natural number.

3. After an RRC connection is established, the signalling-indicated way is notified by an RRC signalling. This way can be used in a complex time-frequency domain to bundle change information. For example, when N is 2, 2 bit indicates a bundling number which is one selected from the set {4, 8, 10, 20} and carries the bundling number information of the sub-frames.

4. Signalling indication in an RACH process.

The step that The location of resources for the bundling transmission of the control channel is determined includes:

the location of resources is determined in one of the following ways for the PDCCH: the PDCCH is transmitted repeatedly in a CCE of a same index of respective bundled sub-frames;

the PDCCH is transmitted repeatedly in a candidate set of a same index in special search spaces of respective bundled sub-frames; and the PDCCH is transmitted repeatedly in a special search space in a pre-defined aggregation level of respective bundled sub-frames.

In the embodiment, the step that the sub-frames transmitted in a bundling way are determined according to a pre-defined way includes:

when the control channel is the ePDCCH, the sub-frames are determined in one of the following ways: all the bundled sub-frames are transmitted in a same PRB; the frequency domain locations of the repeated sub-frames implement frequency hopping in a same set with respect to that of the original sub-frame; and the frequency domain locations of the repeated sub-frames implement frequency hopping in a different set with respect to that of the original sub-frame.

The step that The location of resources for the bundling transmission of the control channel is determined includes:

when the control channel is the ePDCCH, the ePDCCH is transmitted repeatedly on an eCCE of a same index of respective bundled sub-frames;

the ePDCCH is transmitted repeatedly in a same index candidate set in a same PRB of respective bundled sub-frames;

the ePDCCH is transmitted in a same eCCE (such as the whole PRB) in a pre-defined aggregation level in a PRB corresponding to respective bundled sub-frames, wherein a same candidate set index exists in the same PRB; and the ePDCCH is transmitted repeatedly on an eCCE corresponding to a same candidate set index in different PRB sets of respective bundled sub-frames. The set can be pre-defined for cyclic shift (or interval shift).

In addition, other configurations corresponding to the four steps above (need to be fixed, and the specific way is shown in an embodiment): a dispersed/concentrated ePDCCH mapping way is adopted for transmission; a transmission way is fixed as a Beam Forming (BF)/Open Loop (OL) Multiple Input Multiple Output (MIMO); an initial location is fixed; and an antenna port and pilot frequency are fixed (CRS, DMRS, synchronization).

In the embodiment, a corresponding encoding method for data scheduled by the information carried in the control channel or the corresponding encoding method for the information carried in the control channel includes one of the following ways:

a threshold X is pre-defined, when the bit number of information of a transmission block is less than the threshold X, a TBCC is adopted; otherwise, a turbo code is adopted, wherein X is a natural number; and two thresholds X and Y are pre-defined, when the bit number of information of the transmission block is more than or equal to X, a turbo code is adopted, when the bit number of information of the transmission block is more than or equal to Y and is less than X, a TBCC is adopted, and when the bit number of information of the transmission block is less than Y, an RM code is adopted, wherein X and Y are both natural numbers and X>Y.

In the embodiment, a corresponding CRC determining method for the data scheduled by the information carried in the control channel or the method for determining CRC corresponding to the information carried in the control channel includes one of the following ways:

a threshold X1 is pre-defined, when the bit number of information of the transmission block is less than X1, CRC with A1 bits is added, otherwise, CRC with A2 bit is added, wherein A1 and A2 are positive integers, and X1 is a natural number; and two thresholds X1 and Y1 are pre-defined, when the bit number of information of the transmission block is more than or equal to X1, CRC with B2 bits is added, when the bit number of information of the transmission block is more than or equal to Y1 and is less than X1, CRC with B2 bits is added, and when the bit number of information of the transmission block is less than Y1, CRC with B3 bits is added, wherein X1 and Y1 are both natural numbers and X1>Y1.

In the embodiment, (A1, A2) is one of the following sets: (8, 16), (16, 24), (8, 24) and (4, 16); and/or (B1, B2, B3) is one of the following sets: (24, 16, 8) and (16, 8, 4).

Figure 7:
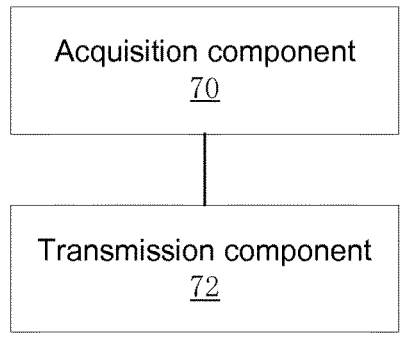
FIG. 7 is a diagram illustrating the structure of an apparatus for transmitting a control channel according to embodiment 1 of the disclosure.

One embodiment further provides an apparatus for transmitting a control channel to implement the embodiments and the preferred implementation ways above, which have been explained, thus not explained any more, and the components involved in the apparatus are described below. As below, the term "component" can implement the combination of software and/or hardware of predetermined functions. Although the apparatus described in the following embodiments is preferably implemented by software, the implementation of hardware or the combination of the software and hardware can also be composed. FIG. 7 is a diagram illustrating the structure of an apparatus for transmitting a control channel according to an embodiment of the disclosure. As shown in FIG. 7, the apparatus includes:

an acquisition component 70 which is connected to a transmission component 72 and is configured to acquire indicating information for indicating a terminal type; and the transmission component 72 which is configured to, when the indicating information indicates that the terminal type is a first terminal type, transmit the control channel to a terminal with the first terminal type in multiple sub-frames.

In the embodiment, the transmission component 72 is further configured to, when the indicating information indicates that the terminal type is a second terminal type, transmit the control channel to the terminal with the second terminal type in a single sub-frame.

In the embodiment, a network side device is further provided, including the apparatus above.

Embodiment 2

Corresponding to embodiment 1, embodiment 2 describes a terminal side.

Figure 8:
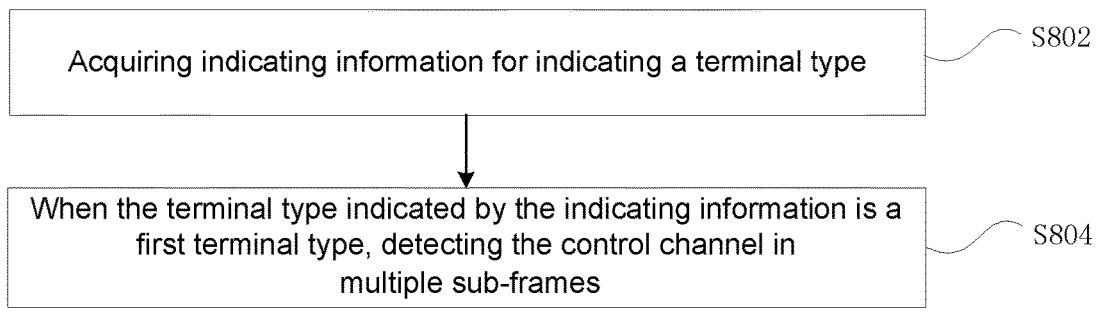
FIG. 8 is a flowchart of a method for processing the transmission of a control channel according to embodiment 2 of the disclosure.

FIG. 8 is a flowchart of a method for processing the transmission of a control channel according to an embodiment of the disclosure. The method is applied to a terminal, as shown in FIG. 8, including:

Step 802: Indicating information for indicating a terminal type is acquired.

Step 804: When the terminal type indicated by the indicating information is a first terminal type, the control channel is detected in multiple sub-frames.

In the embodiment, when the terminal type indicated by the indicating information is a second terminal type, the control channel is detected in a single sub-frame. In the embodiment, the terminal type can be identified by 1 or 2. For example, "1" represents the first terminal type, and "2" represents the second terminal type.

In the embodiment, the step that indicating information for indicating a terminal type is acquired includes at least one of the following steps: the indicating information is acquired according to PRACH information corresponding to the terminal; and the indicating information is acquired according to the position information of the terminal.

The terminal type is determined in the following two ways:

1, the terminal type is determined according to the PRACH information corresponding to the terminal, wherein the PRACH information corresponding to the first terminal type and the second terminal type are different;

2, the terminal type is determined according to PRACH resources corresponding to the terminal, wherein the PRACH resources corresponding to the first terminal type and the second terminal type are different.

The two determining ways can be shown in the following form: an existing LTE terminal access way is utilized as the first terminal type, and a way different from the existing LTE terminal access way is utilized as the second terminal type; or, the terminal type is determined according to the PRACH resources corresponding to the terminal, wherein the PRACH resources corresponding to the first terminal type and the second terminal type are different; and the different PRACH resources can include one of the following resources: different PRACH preamble sequences, different PRACH time-domain resources and different PRACH frequency-domain resources.

In the embodiment, the terminal type can be further determined according to a designated location area in a cell where the terminal is located, wherein the designated location areas corresponding to the first terminal type and the second terminal type are different. Specifically, according to a fixed terminal location way, the terminal in a fixed location in the cell receives the control channel repeatedly in multiple frames.

In the embodiment, it is determined that the control channel carries information through DCI in different formats according to different bandwidths of the LTE system.

In the embodiment, the type of the control channel is determined in one of the following ways: a designated type of the control channel is detected according to the bandwidth of the LTE system; the detected designated type of the control channel is determined according to a carrier type; and the designated type of the control channel is detected regularly.

In the embodiment, the control channel includes a PDCCH and an ePDCCH.

When the terminal type indicated by the indicating information is the first terminal type, the step that a designated type of the control channel is detected according to the bandwidth of the LTE system includes: when the bandwidth is equal to a designated threshold, the PDCCH is detected, and when the bandwidth is larger than the designated threshold, the ePDCCH is detected (for example, when the bandwidth BW=1.4 MHz, the PDCCH is detected; and when BW>1.4 MHz, the ePDCCH is detected); and the step that the designated type of the control channel is detected according to a carrier type includes: the PDCCH is detected by a compatible carrier and the ePDCCH is detected by a non-compatible carrier; and the ePDCCH is detected regularly (the bundled ePDCCH is detected regularly).

When the terminal type indicated by the indicating information is the second terminal type, the step that a designated type of the control channel is detected according to the bandwidth of the LTE system includes: when the bandwidth is equal to a designated threshold, the PDCCH or the ePDCCH is detected, and when the bandwidth is larger than the designated threshold, the ePDCCH is detected (for example, when the bandwidth BW=1.4 MHz, the PDCCH or the ePDCCH is detected; and when BW>1.4 MHz, the PDCCH or the ePDCCH is detected); and the step that the detected designated type of the control channel is determined according to a carrier type includes: the PDCCH is detected by a compatible carrier and the ePDCCH is detected by a non-compatible carrier; the PDCCH is detected regularly; and the PDCCH is adopted regularly.

When the control channel is detected in multiple sub-frames, the terminal determines the data channel location scheduled by the control channel according to the location of the control channel: the data channel and the control channel are transmitted in same one or more sub-frames. The processing process can be applied to the scenarios of no special indication (DCI contains the transmission time of the service channel) and a special pre-definition (the service channel is transmitted in a pre-defined sub-frame time).

In the embodiment, the timing relationship between the data channel and the control channel includes: the data channel is transmitted after the control channel and there are T sub-frames between the data channel and the control channel, where T is 0 or a positive integer.

In the embodiment, the resources corresponding to the control channel are determined in the following ways:

Step 1: The sub-frames transmitted in a bundling way are received according to a pre-defined way or a signalling-indicated way.

Step 2: The location of resources for the bundling transmission of the control channel is determined.

The step that the sub-frames transmitted in a bundling way are determined according to the pre-defined way includes:

the following ways are pre-defined to be adopted in the time domain: each wireless frame utilizes h sub-frames and M wireless frames are configured, where h and M are natural numbers. h includes but is not limited to one of the following numbers: 1, 2, 3, 4, 5 and 6. Specifically as follows:

1: Continuous N sub-frames are received for bundling, where N is a natural number, preferably selected from the set {4, 8, 10 and 20}, and the number and location of OFDM symbols utilized are the same.

2: N sub-frames are bundled at an interval of one sub-frame.

3: Each wireless frame utilizes one sub-frame, and M wireless frames are received.

For a TDD system, the wireless frames can be repeated, or only some configurations are limited to be available. In an example embodiment, only configurations 1-5 are available.

In the embodiment, adopting the bundling way of bundling continuous N sub-frames, where N is a natural number, and the number and location of OFDM symbols utilized by each of the N sub-frames are the same; or, N sub-frames are bundled at an interval of a designated number of sub-frames. When the bundling way of bundling continuous N sub-frames is adopted, N is one of the following numbers: 4, 8, 10 and 20.

In the embodiment, a signalling-indicated way is received in one of the following ways to acquire indicated bundling transmission information:

bundling transmission information is acquired by receiving an MIB message (Nbit in 10 bit reserved bit, N is a natural number);

the indicated bundling transmission information is acquired by receiving a designated bit (Nbit) carried in reserved sub-carriers on the two sides of a primary synchronization sequence or a secondary synchronization sequence;

after an RRC connection is established, an RRC signalling is received to acquire the indicated bundling transmission information, specifically, after an RRC connection is established, change information can be bundled by receiving an RRC signalling in a complex time-frequency domain, for example, when N is 2, 2 bit indicates a bundling number which is one selected from the set {4, 8, 10, 20} and carries the bundling number information of the sub-frames; and the indicated bundling transmission information is determined according to a signalling in an RACH process (such Msg2).

In the embodiment, the step that The location of resources for the bundling transmission of the control channel is determined includes:

for the PDCCH, the location of resources is determined by one of the following ways: for the PDCCH, the way for detecting the time and frequency domains of the PDCCH in each sub-frame is invariable; and the PDCCH is detected blindly in a special search space in a pre-defined aggregation level X in respective sub-frames, wherein X is a natural number, preferably selected from 16, 32, 64, 128, 256 and the like.

In the embodiment, when the control channel is the ePDCCH, the sub-frames are determined in one of the following ways: all the bundled sub-frames are transmitted in a same PRB; the frequency domain locations of the repeated sub-frames implement frequency hopping in a same set with respect to that of the original sub-frame; and the frequency domain locations of the repeated sub-frames implement frequency hopping in a different set with respect to that of the original sub-frame.

When the control channel is the ePDCCH, the step that The location of resources for the bundling transmission of the control channel is determined includes at least one of the following steps: the ePDCCH is detected blindly in a same PRB set in a pre-defined aggregation level in respective sub-frames; and the ePDCCH is detected blindly in different PRB sets according to the serial numbers of the bundled sub-frames in respective sub-frames.

When the control channel is transmitted in multiple sub-frames, the method for determining a transmission way corresponding to the control channel (ePDCCH) specifically includes:

(1) A bundling condition is acquired according to a pre-defined way or a signalling-indicated way.

The bundled sub-frames are received according to a pre-defined way.

One of the following ways is pre-defined to be adopted in the time domain:

1: Continuous N bundles of sub-frames are received, where N is a natural number, preferably selected from the set {4, 8, 10 and 20}, and the number and location of OFDM symbols utilized are the same.

2: N sub-frames are bundled at an interval of one sub-frame.

3: Each wireless frame utilizes one sub-frame, and M wireless frames are received.

For a TDD system, the wireless frames may be repeated, or only some configurations are limited to be available. In an example embodiment, only configurations 1-5 are available.

The terminal receives indicating bundling in a signalling-indicated way in one of the following ways:

1: An MIB message is received (N bit in 10 bit reserved bit) to acquire bundling information.

2: N bit carried in reserved sub-carriers on the two sides of a primary synchronization sequence or a secondary synchronization sequence is received to acquire indicated bundling information.

3: After an RRC connection is established, change information in a complex time-frequency domain may be acquired by receiving an RRC signalling.

For example, when N is 2, 2 bit indicates a bundling number which is one selected from the set {4, 8, 10, 20} and carries the bundling number information of the sub-frames.

The frequency-domain pre-definition (only for the ePDCCH) adopts one of the following ways:

1: All the bundled sub-frames are transmitted on a same PRB.

2: The frequency domain locations of the repeated sub-frames implement frequency hopping in a designated set with respect to that of the original sub-frame. For example, the cyclic shift of a frequency-domain location is carried out in the set of {2, 4, 8 and 10} of the PRB.

3: The frequency domain locations of the repeated sub-frames implement frequency hopping in a different set with respect to that of the original sub-frame.

(2): The location of resources for the bundling transmission of the control channel is determined.

The bundling resource transmission of the ePDCCH adopts one of the following ways:

1: The way of blindly detecting the ePDCCH in each sub-frame is invariable.

2: The ePDCCH is blindly detected in a same PRB set in a pre-defined aggregation level X in respective sub-frames (in addition, a whole PRB is further included).

3: The ePDCCH is blindly detected in different PRB sets in respective sub-frames according to the serial numbers of the bundled sub-frames, wherein the set can be pre-defined for cyclic shift or interval shift.

In addition, other configurations corresponding to the four steps above (need to be fixed, and the specific way is shown in an embodiment): a dispersed/concentrated ePDCCH mapping way is adopted for transmission; a transmission way fixes a BF/OL MIMO; fixation of an initial location; and fixation of an antenna port and pilot frequency (CRS, DMRS, synchronization)

The terminal includes: an MTC terminal and also includes other terminals which have coverage enhancement demands.

The method for transmitting the control channel provided by the embodiment can ensure that the terminal which demands coverage promotion can receive control information correctly and also ensures the normal communication between the terminal and a network without deploying an additional site, a relay station and other high-cost devices for the operator.

Figure 9:
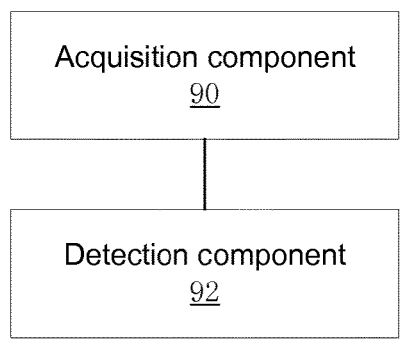
FIG. 9 is a diagram illustrating the structure of an apparatus for processing the transmission of a control channel according to embodiment 2 of the disclosure.

An embodiment of the disclosure further provides a diagram illustrating the structure of an apparatus for processing the transmission of a control channel. As shown in FIG. 9, the apparatus includes:

an acquisition component 90 which is connected to a detection component 92 and is configured to acquire indicating information for indicating a terminal type; and the detection component 92 which is configured to, when the terminal type indicated by the indicating information is a first terminal type, detect the control channel in multiple sub-frames.

In an example embodiment, the detection component 92 is further configured to: when the indicating information indicates that the terminal type is the second terminal type, detect the control channel in a single sub-frame.

An embodiment further provides a terminal, including the apparatus above.

To be understood better, the embodiment is described below in combination with related embodiments and related drawings.

Embodiment 3

To ensure the correct transmission of a control channel of an MTC device or other terminals in a low-coverage environment, the embodiments of the disclosure provide a method and an apparatus for transmitting the control channel, so that a base station can distinguish a terminal device in a low-coverage environment to transmit the control channel, and the terminal which demands coverage promotion can receive control information from the base station correctly, thereby ensuring the data transmission of the terminal.

In an FDD system, the transmission of the control channel is described by a bundling transmission method provided by the embodiments of the disclosure in the embodiment in detail.

Figure 10:
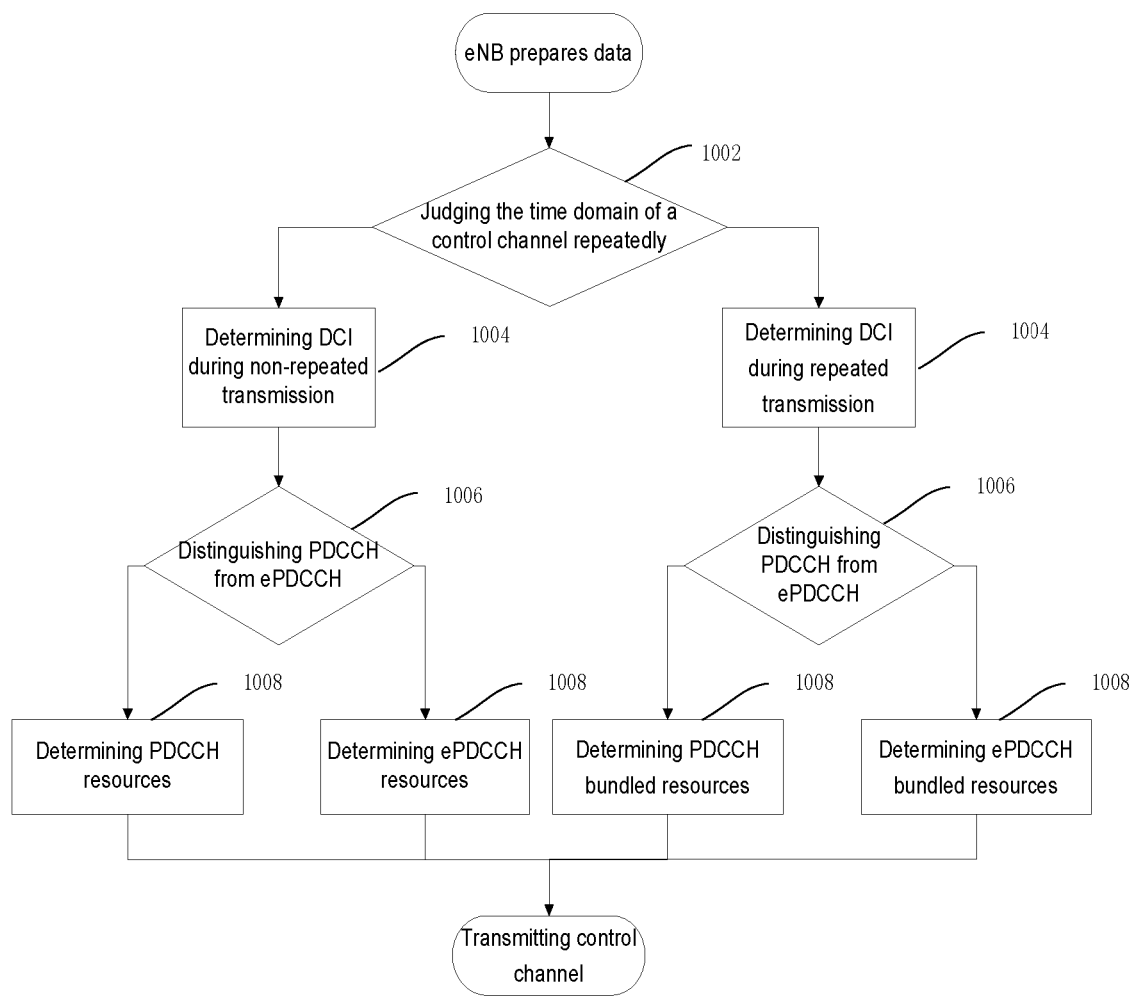
FIG. 10 is a diagram illustrating the flow of a transmitting side according to an embodiment of the disclosure.
Figure 11:
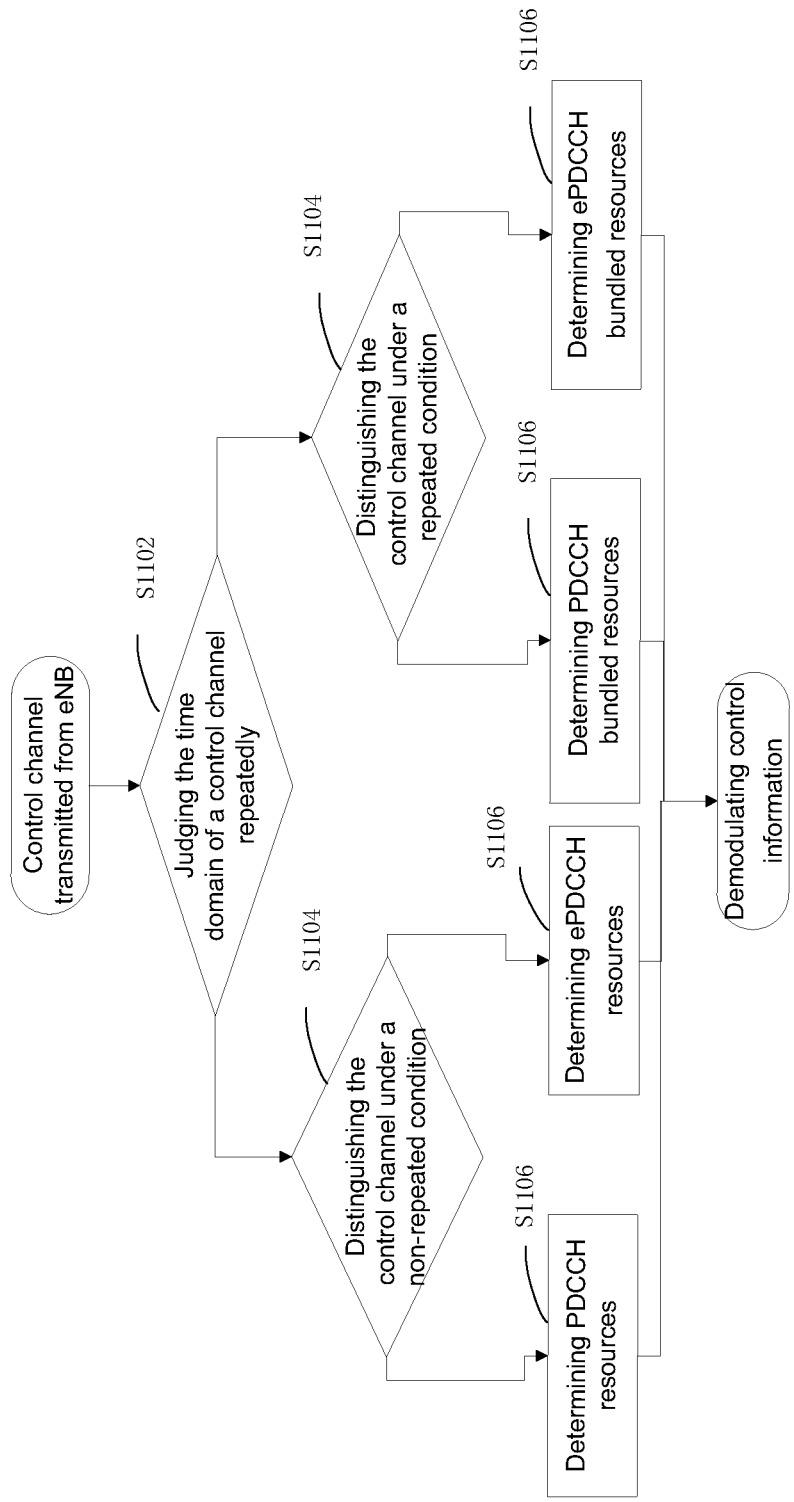
FIG. 11 is a diagram illustrating the flow of a receiving side according to an embodiment of the disclosure.

As shown in FIG. 10, a specific processing step for a base station side includes:

Step 1002: The base station judges whether the transmission of the control channel needs bundling repeated transmission. The base station, when receiving a preamble according to the access resources during the random access of the terminal in a special location, i.e., the time-frequency resources in a PRACH different from an LTE terminal, determines that the terminal is one having a special demand, so that the control channel needs bundling transmission.

Step 1004: The base station determines control information. According to the terminal type that the terminal is one demanding coverage enhancement, the base station utilizes a compact DCI format. Moreover, for the compact DCI under a multi-frame repetition condition, the overhead of a bit domain based on the existing protocol is reduced, and the number of repetition bit domain of a service channel is further added. In an example embodiment, the added number of repetition of an indicator service channel utilizes 2 bit information, is added in the DCI, and is preferably selected from the set {10, 20, 30, 50}, and the indicator service channel is transmitted repeatedly for 10 times.

The processing way for the control channel is still according to 16 bit CRC addition and a TBCC way. The bit of the information transmitted by the data channel indicated by the control channel is subjected to CRC addition and channel coding by the following ways:

a threshold X is pre-defined, when the bit number of information of a transmission block is less than the threshold, 8 bit CRC is added, otherwise, 16 bit CRC is added; and a threshold M is pre-defined, when the bit number of information of a transmission block is less than the threshold, TBCC is adopted, otherwise, turbo coding is adopted, where, X and M are natural numbers.

Step 1006: The PDCCH and the ePDCCH are distinguished. According to the terminal type that the terminal is one demanding coverage enhancement, the base station utilizes the ePDCCH for bundling transmission.

Step 1008: The bundling transmission is indicated.

An indicated bundling time-frequency domain location is pre-defined.

A way pre-defined in a time domain:

adopting the bundling way of bundling continuous N sub-frames, wherein N is a natural number and is preferably selected from the set {4, 8, 10 and 20}, and the number and location of OFDM symbols utilized are the same.

A way pre-defined in a frequency domain:

all the bundled sub-frames are transmitted on a same PRB; and

The location of resources for the bundling transmission of the control channel is determined.

The transmission way for the bundled resources of the ePDCCH is as follows:

the ePDCCH is transmitted repeatedly on an eCCE of a same index in respective bundled sub-frames, which requires a same candidate set index in a same PRB set.

In addition, the ePDCCH is transmitted in a concentrated mapping way; the transmission way is fixed as a BF way; the initial location is fixed as a fourth OFDM symbol; and an antenna port is fixed as a port 107.

The processing step for the terminal includes:

Step 1102: Single-frame transmission and bundling transmission receiving of the control channel are determined.

A terminal having a special demand receives PRACH configuration information from the base station, and indicates that a multi-frame repeated receiving is needed through random access, namely, having a different random access way from that of an LTE terminal, specifically, a preamble sequence is transmitted by occupying different time-frequency resources of the PRACH. At the moment, the terminal determines that the control channel is subjected to the bundling transmission receiving.

Step 1104: A detected control channel type is determined.

In case of the multi-frame bundling repetition of the control channel, the ePDCCH is detected according to the terminal type that the terminal is one having a special demand.

Step 1106: The control channel is detected.

The blindly-detected control channel is detected under a multi-frame condition according to the configuration of bundled resources.

Firstly, the bundling condition is known according to pre-definition. The bundled sub-frames are received according to a pre-defined way.

A way pre-defined in a time domain:

continuous N sub-frames are received for bundling, where N is a natural number and is preferably selected from the set {4, 8, 10 and 20}, and the number and location of OFDM symbols utilized are the same.

A way pre-defined in a frequency domain:

all the bundled sub-frames are transmitted on a same PRB.

Secondly, The location of resources for the bundling transmission of the control channel is determined. The transmission way for the bundled resources of the ePDCCH is as follows:

the ePDCCH is transmitted repeatedly on an eCCE of a same index of respective bundled sub-frames, which requires a same candidate set index in a same PRB set and an invariable blind detection way.

In addition, the ePDCCH is transmitted in a concentrated mapping way during the receiving; the transmission way is fixed as a BF way; the initial location is fixed as a fourth OFDM symbol; and an antenna port is fixed as a port 107.

By the bundling transmission of the ePDCCH, the embodiment can ensure that a terminal device can receive control information correctly in a low-coverage environment, and ensures a normal communication requirement of the terminal device.

Embodiment 4

In a TDD system, the transmission of a control channel is described by a bundling transmission method provided by the embodiments of the disclosure in the embodiment in detail.

The specific processing step for a base station includes:

Step 1002: A base station judges whether the transmission of the control channel needs bundling repeated transmission. The base station, when receiving a preamble according to the access resources during the random access of a terminal in a special location, i.e., the time-frequency resources in a PRACH different from an LTE terminal, determines that the terminal is one having a special demand, so that the control channel needs bundling transmission.

Step 1004: The base station determines control information. According to the terminal type that the terminal is one demanding coverage enhancement, the base station utilizes a compact DCI format. Moreover, for the compact DCI under a multi-frame repetition condition, the overhead of a bit domain based on the existing protocol is reduced, and the number of repetition bit domain of a service channel is further added. In an example embodiment, the added number of repetition of an indicator service channel utilizes 2 bit information, is added in the DCI, and is preferably selected from the set {10, 20, 50, 100}, and the indicator service channel is transmitted repeatedly for 10 times.

The processing way for the control channel is still according to 16 bit CRC addition and a TBCC way. The bit of the information transmitted by the data channel indicated by the control channel is subjected to CRC addition and channel coding by the following ways:

two thresholds X and Y are pre-defined, when the bit number of information of the transmission block is more than X, 24 bit CRC is added, and when the bit number of information of the transmission block is more than Y and is less than X, 16 bit CRC is added, otherwise, 8 bit CRC is added; and two thresholds M and N are pre-defined, when the bit number of information of the transmission block is more than M, turbo coding is adopted; when the bit number of information of the transmission block is more than N and is less than M, a TBCC way is adopted; and when the bit number of information of the transmission block is less than N, an RM coding way is adopted, wherein X, Y, M and N are natural numbers.

Step 1006: The PDCCH and the ePDCCH are distinguished. According to the terminal type that the terminal is one demanding coverage enhancement, the base station utilizes the ePDCCH for bundling transmission.

Step 1008: The bundling transmission is indicated.

An indicated bundling time-frequency domain location is pre-defined.

A way pre-defined in a time domain:

when TDD is 1, continuous M wireless frames are bundled, wherein N is a natural number and is preferably selected from the set {1, 2, 10 and 20}, and the number and location of OFDM symbols utilized are the same.

A way pre-defined in a frequency domain:

all the bundled sub-frames are transmitted on a same PRB.

The location of resources for the bundling transmission of the control channel is determined.

The transmission way for the bundled resources of the ePDCCH is as follows:

the ePDCCH is transmitted repeatedly on an eCCE of a same index in respective bundled sub-frames, which requires a same candidate set index in a same PRB set and an invariable blind detection way.

In addition, the ePDCCH is transmitted in a concentrated mapping way; the transmission way is fixed as a BF way; the initial location is fixed as a fourth OFDM symbol; and an antenna port is fixed as a port 107.

As shown in FIG. 8, the processing step for the terminal includes: Step 1102: Single-frame transmission and bundling transmission receiving of the control channel are determined.

A terminal having a special demand receives PRACH configuration information from the base station, and indicates that a multi-frame repeated receiving is needed through random access, namely, having a different random access way from that of an LTE terminal, specifically, a preamble sequence is transmitted by occupying different PRACH time-frequency resources. At the moment, the terminal determines that the control channel is subjected to the bundling transmission receiving.

Step 1104: The detected control channel type is determined.

In case of the multi-frame bundling repetition of the control channel, the ePDCCH is detected according to the terminal type that the terminal is one having a special demand.

Step 1106: The control channel is detected.

The blindly-detected control channel is detected under a multi-frame condition according to the configuration of bundled resources.

Firstly, the bundling condition is known according pre-definition. The bundled sub-frames are received according to a pre-defined way.

A way pre-defined in a time domain:

when TDD is 1, continuous M wireless frames are bundled, wherein N is a natural number and is preferably selected from the set {1, 2, 10 and 20}, and the number and location of OFDM symbols utilized are the same.

A way pre-defined in a frequency domain:

all the bundled sub-frames are transmitted on a same PRB.

The location of resources for the bundling transmission of the control channel is determined. The transmission way for the bundled resources of the ePDCCH is as follows:

the ePDCCH is transmitted repeatedly on an eCCE of a same index of respective bundled sub-frames, which requires a same candidate set index in a same PRB set and an invariable blind detection way.

In addition, the ePDCCH is transmitted in a concentrated mapping way during the receiving; the transmission way is fixed as a BF way; the initial location is fixed as the fourth OFDM symbol; and an antenna port is fixed as a port 107.

By the bundling transmission of the ePDCCH, the embodiment can ensure that a terminal device can receive control information correctly in a low-coverage environment, and ensures the normal communication requirement of the terminal device.

Embodiment 5

In an FDD system, the transmission of a control channel is described by a single-frame transmission method provided by the embodiments of the disclosure in the embodiment in detail.

The specific processing step for a base station includes:

Step 1002: A base station judges whether the transmission of the control channel needs bundling repeated transmission. The base station, when receiving a preamble according to the access resources during the random access of a terminal in a special location, i.e., the time-frequency resources in a PRACH different from an LTE terminal, determines that the terminal is an LTE terminal, so that the control channel does not need bundling transmission, i.e., single-frame transmission.

Step 1004: The base station determines control information. According to a system bandwidth, when BW=1.4 MHz, the base station utilizes a compact DCI format, and the overhead of the compact DCI in a bit domain based on the existing protocol is reduced.

The processing way for the control channel is still according to 16 bit CRC addition and a TBCC way. The bit of information transmitted by a data channel indicated by the control channel is still according to 24 bit CRC addition and turbo channel encoding.

Step 1006: The PDCCH and the ePDCCH are distinguished. According to a system bandwidth, when BW=1.4

MHz, the base station utilizes the PDCCH or the ePDCCH, and the PDCCH is used here.

Step 1008: The bundling transmission is indicated.

For the dynamic scheduling transmission of each sub-frame, the resource for the control channel is still determined according to the existing protocol.

As shown in FIG. 8, the processing step for the terminal includes:

Step 1102: Single-frame transmission and bundling transmission receiving of the control channel are determined.

A terminal having a special demand receives PRACH configuration information from the base station, and indicates that a multi-frame repeated receiving is not needed through random access, namely, having a same random access way as that of an LTE terminal, specifically, a preamble sequence is transmitted by occupying same PRACH time-frequency resources. At the moment, the terminal determines that the control channel is subjected to single-frame transmission receiving.

Step 1104: The detected control channel type is determined.

According to a system bandwidth, when BW=1.4 MHz, the base station utilizes the PDCCH or the ePDCCH, and the PDCCH is used here.

Step 1106: The control channel is detected.

The dynamic scheduling transmission of each sub-frame of the control channel is detected blindly, and the resource for the control channel is still determined according to the existing protocol.

Without adopting the transmission of the control channel, the embodiment can ensure that an ordinary terminal device can receive control information correctly, and also ensures the normal communication requirement of the terminal device.

Embodiment 6

In an FDD system, the transmission of a control channel is described by a bundling transmission method provided by the embodiments of the disclosure in the embodiment in detail.

The specific processing step for a base station includes:

Step 1002: A base station judges whether the transmission of the control channel needs bundling repeated transmission. According to a pre-defined way, the base station is configured to transmit the control channel repeatedly in a bundling way in multi frames to the terminal in a fixed location in the cell under the control of the horizontal transmission angle and the vertical transmission angle of the base station.

Step 1004: The base station determines control information. According to the terminal type that the terminal is one demanding coverage enhancement, the base station utilizes a compact DCI format. Moreover, under a multi-frame repetition condition, the overhead of the compact DCI in a bit domain based on the existing protocol is reduced.

The processing way for the control channel is still according to 16 bit CRC addition and a TBCC way. The bit of the information transmitted by the data channel indicated by the control channel is subjected to CRC addition and channel coding by the following ways:

a threshold X is pre-defined, when the bit number of information of a transmission block is less than the threshold, 8 bit CRC is added, otherwise, 16 bit CRC is added; and a threshold M is pre-defined, when the bit number of information of a transmission block is less than the threshold, TBCC is adopted, otherwise, turbo coding is adopted, where, X and M are natural numbers.

Step 1006: The PDCCH and the ePDCCH are distinguished. According to the terminal type that the terminal is one demanding coverage enhancement, the base station utilizes the ePDCCH for bundling transmission.

Step 1008: The bundling transmission is indicated.

An indicated bundling time-frequency domain location is pre-defined.

A way pre-defined in a time domain:

N sub-frames are bundled at an interval of one sub-frame, wherein N is a natural number and is preferably selected from the set {4, 8, 10 and 20}, and the number and location of OFDM symbols utilized are the same.

A way pre-defined in a frequency domain:

the frequency domain locations of the repeated sub-frames implement frequency hopping in a designated set with respect to that of the original sub-frame. For example, the first sub-frame in the repeated sub-frames is transmitted by selecting an RB of which the PRB number is 2 from a PRB set {2, 4, 8, 10}, the second sub-frame is transmitted by selecting an RB of which the PRB number is 4, and so on, to implement the cyclic shift selection of a frequency domain location.

The location of resources for the bundling transmission of the control channel is determined.

The transmission way for the bundled resources of the ePDCCH is as follows:

the ePDCCH is transmitted repeatedly in the same candidate set index in a same PRB set of respective bundled sub-frames, and the blind detection way is invariable; and the number of the eCCE blindly detected by each sub-frame is different according to different PRBs in the same set.

In addition, the ePDCCH is transmitted in a dispersed mapping way; the transmission way is fixed as a BF way; the initial location is fixed as a fourth OFDM symbol; and an antenna port is fixed as a port 107.

The processing step for the terminal includes:

Step 1102: Single-frame transmission and bundling transmission receiving of the control channel are determined.

A terminal which has a special demand is configured to carry out the multi-frame bundling repeated receiving of the control channel according to a pre-defined way. At the moment, the terminal determines that the control channel is subjected to the bundling transmission receiving.

Step 1104: The detected control channel type is determined.

In case of the multi-frame bundling repetition of the control channel, the ePDCCH is detected according to the terminal type that the terminal is one having a special demand.

Step 1106: The control channel is detected.

The blindly-detected control channel is detected under a multi-frame condition according to the configuration of bundled resources.

Firstly, the bundling condition is known according pre-definition. The bundled sub-frames are received according to a pre-defined way.

A way pre-defined in a time domain:

N sub-frames are bundled at an interval of one sub-frame, wherein N is a natural number and is preferably selected from the set {4, 8, 10 and 20}, and the number and location of OFDM symbols utilized are the same.

A way pre-defined in a frequency domain:

the frequency domain locations of the repeated sub-frames implement frequency hopping in a designated set with respect to that of the original sub-frame. For example, the first sub-frame in the repeated sub-frames is detected by selecting an RB of which the PRB number is 2 from a PRB set {2, 4, 8, 10}, the second sub-frame is detected by selecting an RB of which the PRB number is 4, and so on, to implement the cyclic shift selection of a frequency domain location.

The location of resources for the bundling transmission of the control channel is determined.

The transmission way for the bundled resources of the ePDCCH is as follows:

The ePDCCH is transmitted repeatedly in a same candidate set index in a same PRB set of respective bundled sub-frames, and the blind detection way is invariable; moreover, the number of the eCCE blindly detected by each sub-frame is different according to different PRBs in the same set.

In addition, the ePDCCH is transmitted in a dispersed mapping way; the transmission way is fixed as a BF way; the initial location is fixed as a fourth OFDM symbol; and an antenna port is fixed as a port 107.

By the bundling transmission of the ePDCCH, the embodiment can ensure that a terminal device can receive control information correctly in a low-coverage environment, and ensures the normal communication requirement of the terminal device.

Embodiment 7

In an FDD system, the transmission of a control channel is described by a bundling transmission method in the embodiment in detail. The specific processing step for a base station side includes:

Step 1002: The base station side judges whether the transmission of the control channel needs bundling repeated transmission. According to a pre-defined way, the base station is configured to transmit the control channel repeatedly in a bundling way in multi frames to the terminal in a fixed location in the cell under the control of the horizontal transmission angle and the vertical transmission angle of the base station.

Step 1004: The base station determines control information. According to the terminal type that the terminal is one demanding coverage enhancement, the base station utilizes a compact DCI format. Moreover, under a multi-frame repetition condition, the overhead of the compact DCI in a bit domain based on the existing protocol is reduced.

The processing way for the control channel is still according to 16 bit CRC addition and a TBCC way. The bit of the information transmitted by the data channel indicated by the control channel is subjected to CRC addition and channel coding by the following ways:

a threshold X is pre-defined, when the bit number of information of a transmission block is less than the threshold, 8 bit CRC is added, otherwise, 16 bit CRC is added; and a threshold M is pre-defined, when the bit number of information of a transmission block is less than the threshold, TBCC is adopted, otherwise, turbo coding is adopted, where, X and M are natural numbers.

Step 1006: The PDCCH and the ePDCCH are distinguished. According to the terminal type that the terminal is one demanding coverage enhancement, the base station utilizes the ePDCCH for bundling transmission.

Step 1008: The bundling transmission is indicated.

A signalling indicates a bundling time-frequency domain location. The bundling is carried out in a signalling-indicated way; before an RRC signalling is established, an MIB message (a broadcast channel) or a modulation secondary synchronization sequence (a reserved sub-carrier Nbit, for example, 2 bit indicates a bundling number which is one selected from the set {4, 8, 10, 20} and carries the bundling number information of the sub-frames; and the fixation of a frequency domain utilizes the resources of a PRB of which the number is 2.

After an RRC connection is established, complex time-frequency domain bundling change information can be notified by an RRC signalling.

A notified time domain bundling way is:

N sub-frames are bundled, where N is a natural number and is preferably selected from the set {4, 8, 10 and 20}, and the number and location of OFDM symbols utilized are the same.

A notified frequency domain bundling way is:

the frequency domain locations of the repeated sub-frames implement frequency hopping in two different sets with respect to that of the original sub-frame. For example, the first sub-frame in the repeated sub-frames is transmitted by selecting an RB of which the PRB number is 2 from a PRB set {2, 4, 8, 10}, the second sub-frame in the repeated sub-frames is transmitted by selecting the RB of which the PRB number is 16 from a PRB set {16, 20, 24, 28}, the third sub-frame in the repeated sub-frames is transmitted by selecting an RB of which the PRB number is 4 from a PRB set {2, 4, 8, 10}, the fourth sub-frame in the repeated sub-frames is transmitted by selecting the RB of which the PRB number is 20 from a PRB set {16, 20, 24, 28}, and so on, to implement the alternative cyclic shift selection of a frequency domain location in different sets.

The location of resources for the bundling transmission of the control channel is determined.

The transmission way for the bundled resources of the ePDCCH is as follows:

the ePDCCH is transmitted repeatedly on an eCCE corresponding to the same candidate set index in different PRB sets of respective bundled sub-frames, wherein the set is pre-defined as alternative cyclic shift selection, and the eCCE has different numbers in different PRBs.

In addition, the ePDCCH is transmitted in a dispersed mapping way; the transmission way is fixed as a BF way; the initial location is fixed as a fourth OFDM symbol; and an antenna port is fixed as a port 107.

The processing step for the terminal includes:

Step 1102: Single-frame transmission and bundling transmission receiving of the control channel are determined.

A terminal which has a special demand indicates a bundling time-frequency domain location by a signalling according to a signalling-indicated way. The bundling is carried out in a signalling-indicated way; before an RRC signalling is established, an MIB message (a broadcast channel) or a modulation secondary synchronization sequence (a reserved sub-carrier Nbit, for example, 2 bit indicates a bundling number which is one selected from the set {4, 8, 10, 20} and carries the bundling number information of the sub-frames; and the fixation of a frequency domain utilizes the resources of a PRB of which the number is 2.

After an RRC connection is established, complex time-frequency domain bundling change information can be acquired by an RRC signalling.

Step 1104: The type of the detected control channel is determined.

In case of the multi-frame bundling repetition of the control channel, the ePDCCH is detected according to the terminal type that the terminal is one having a special demand.

Step 1106: The control channel is detected.

The blindly-detected control channel is detected under a multi-frame condition according to the configuration of bundled resources.

Firstly, the bundling condition is known according pre-definition. The bundled sub-frames are received according to the signalling-indicated way; before the establishment of the RRC, fixed time-frequency domain resources are acquired by a receiving MIB; and after the establishment of the RRC, the time-frequency domain resources are acquired by a receiving signalling, wherein a notified time domain bundling way is:

N sub-frames are bundled, where N is a natural number and is preferably selected from the set {4, 8, 10 and 20}, and the number and location of OFDM symbols utilized are the same.

A notified frequency domain bundling way is:

the frequency domain locations of the repeated sub-frames implement frequency hopping in two different sets with respect to that of the original sub-frame. For example, the first sub-frame in the repeated sub-frames is transmitted by selecting an RB of which the PRB number is 2 from a PRB set {2, 4, 8, 10}, the second sub-frame in the repeated sub-frames is transmitted by selecting the RB of which the PRB number is 16 from a PRB set {16, 20, 24, 28}, the third sub-frame in the repeated sub-frames is transmitted by selecting an RB of which the PRB number is 4 from a PRB set {2, 4, 8, 10}, the fourth sub-frame in the repeated sub-frames is transmitted by selecting the RB of which the PRB number is 20 from a PRB set {16, 20, 24, 28}, and so on, to implement the alternative cyclic shift selection of a frequency domain location in different sets.

Secondly, the location of resources for the bundling transmission of the control channel is determined.

The transmission way for the bundled resources of the ePDCCH is as follows:

the ePDCCH is transmitted repeatedly on an eCCE corresponding to a same candidate set index in different PRB sets of respective bundled sub-frames, wherein the set is pre-defined as alternative cyclic shift selection, and the eCCE has different numbers in different PRBs.

In addition, the ePDCCH is transmitted in a dispersed mapping way; the transmission way is fixed as a BF way; the initial location is fixed as a fourth OFDM symbol; and an antenna port is fixed as a port 107.

By the bundling transmission of the ePDCCH, the embodiment can ensure that a terminal device can receive control information correctly in a low-coverage environment, and ensures the normal communication requirement of the terminal device.

It can be seen from what described above that, the method for transmitting control information provided by an embodiment of the disclosure can improve the reliability of system control information greatly, improve the coverage performance of the terminal device deployed in a low-coverage environment, and ensure the normal communication of the terminal device.

In another embodiment, software is further provided, which is configured to execute the technical solutions described in the embodiments and preferred embodiments above.

In another embodiment, a storage medium is further provided, in which the software is stored. The storage medium includes but is not limited to a compact disk, a floppy disk, a hard disk, an erasable memory and the like.

Obviously, those skilled in the art shall understand that the components or steps of the embodiments of the disclosure may be implemented by general computing apparatus and centralized in a single computing apparatus or distributed in a network consisting of multiple computing apparatus. Optionally, the components or steps may be implemented by program codes executable by the computing apparatus, so that they may be stored in a storage apparatus and executed by the computing apparatus, and, in some cases, the steps can be executed in a sequence different from the illustrated or described sequence, or they are respectively made into the integrated circuit components or many of them are made into a single integrated circuit component. By doing so, the embodiments of the disclosure are not limited to any specific combination of hardware and software.

The above are only preferred embodiments of the invention and not intended to limit the invention. For those skilled in the art, various modifications and changes can be made in the invention. Any modifications, equivalent replacements, improvements and the like within the spirit and principle of the disclosure shall fall within the scope of protection of the disclosure.

INDUSTRIAL APPLICABILITY

The technical solutions provided by the embodiments of the disclosure can be applied to the process of transmitting and processing the transmission of the control channel. Based on the technical solutions, the technical means that the control channel is transmitted to the terminal in multiple sub-frames when the indicating information indicates that the terminal type is the first terminal type is adopted to solve the technical problems that the downlink control channel cannot be transmitted repeatedly and the like in the related arts, so that the network side can distinguish the terminal in a low-coverage environment to transmit the control channel, and the terminal which demands coverage promotion can be ensured to receive control information from a base station correctly, thereby ensuring the data transmission of the terminal.

What is claimed is:

1. A method for transmitting a control channel, which is applied to a network side device, characterized by comprising:

acquiring indicating information for indicating a terminal type; and when the indicating information indicates that the terminal type is a first terminal type, transmitting the control channel to the terminal with the first terminal type in multiple sub-frames, wherein a compact Downlink Control Information DCI format is utilized during repeated transmission of the same information over the control channel in the multiple sub-frames, and a bit domain indicating a repetition number of a service channel is added in the compact DCI format;

when the indicating information indicates that the terminal type is a second terminal type, transmitting the control channel to the terminal with the second terminal type in a single sub-frame.

2. The method according to claim 1, characterized in that acquiring indicating information for indicating the terminal type comprises at least one of the following steps:

acquiring the indicating information according to Physical Random Access Channel, PRACH, information corresponding to the terminal; and acquiring the indicating information according to the location information of the terminal.

3. The method according to claim 2, characterized in that acquiring the indicating information according to PRACH information corresponding to the terminal comprises:
  determining the terminal type according to the PRACH information corresponding to the terminal, wherein the PRACH information corresponding to the first terminal type and the second terminal type are different;
  determining the terminal type according to PRACH resources corresponding to the terminal, the PRACH resources corresponding to the first terminal type and the second terminal type are different
  determining the terminal type according to a designated location area in a cell where the terminal is located, wherein the designated location areas corresponding to the first terminal type and the second terminal type are different.

4. The method according to claim 1, characterized in that a bit number of Downlink Control Information, DCI, of the first terminal type is not more than a bit number of DCI of the second terminal type; or
  in a same transmission mode, the DCI corresponding to the control channel transmitted in multiple sub-frames is different from the DCI corresponding to the control channel transmitted in a single sub-frame.

5. The method according to claim 1, characterized in that a type of the control channel is determined in one of the following ways:
  determining the type of the control channel to be adopted according to a bandwidth of a Long Term Evolution, LTE, system;
  determining the type of the control channel to be adopted according to a carrier type;
  adopting a designated type of the control channel regularly; and
  configuring the type of the control channel by a high-layer signalling.

6. The method according to claim 5, characterized in that the control channel comprises a Physical Downlink Control Channel, PDCCH, and an enhanced Physical Downlink Control Channel, ePDCCH;
  when the terminal type indicated by the indicating information is the first terminal type;
  determining the type of the control channel to be adopted according to the bandwidth of the LTE system comprises: when the bandwidth is equal to a designated threshold, the PDCCH is adopted, and when the bandwidth is larger than the designated threshold, the ePDCCH is adopted;
  determining the type of the control channel to be adopted according to the carrier type comprises: the PDCCH is adopted in case of a non New Carrier Type (NCT) and the ePDCCH is adopted in case of an NCT;
  adopting the designated type of the control channel regularly comprises: the ePDCCH is adopted regularly; and
  when the terminal type indicated by the indicating information is the second terminal type;
  determining the type of the control channel to be adopted according to the bandwidth of the LTE system comprises: when the bandwidth is equal to the designated threshold, the PDCCH or the ePDCCH is adopted, and when the bandwidth is larger than the designated threshold, the ePDCCH is adopted;
  determining the type of the control channel to be adopted according to the carrier type comprises: the PDCCH is adopted in case of the non NCT and the ePDCCH is adopted in case of the NCT;
  adopting the designated type of the control channel regularly comprises: the PDCCH is adopted regularly, or the ePDCCH is adopted regularly.

7. The method according to claim 5, characterized in that when the control channel is transmitted to the terminal with the first terminal type in multiple sub-frames, the method comprises:
  transmitting a data channel scheduled by the control channel and/or an uplink control channel corresponding to the control channel in the sub-frames.

8. The method according to claim 7, characterized in that the repetition number of the data channel or the uplink control channel is determined by one of the following ways:
  the repetition number of the data channel or the uplink control channel being in a corresponding relationship with that of the control channel;
  indicating the repetition number through the control information in the control channel; and
  adopting a pre-defined repetition number.

9. The method according to claim 7, characterized in that a timing relationship between the data channel and the control channel comprises:
  the data channel and the control channel are transmitted in same one or more sub-frames; or, the data channel is transmitted after the control channel and there are T sub-frames between the data channel and the control channel, where T is 0 or a positive integer.

10. The method according to claim 1, characterized in that the resources corresponding to the control channel are determined in the following ways:
  determining the sub-frames transmitted in a bundling way according to a pre-defined way or a signalling-indicated way, the bundling transmission refers to the repeated transmission of the control channel in a time domain; and
  determining the location of resources for the bundling transmission of the control channel.

11. The method according to claim 10, characterized in that determining the sub-frames transmitted in the bundling way according to the pre-defined way comprises:
  the following pre-defined way to be adopted in the time domain: utilizing h sub-frames in each wireless frame and configuring M wireless frames, h and M are natural numbers.

12. The method according to claim 11, characterized in that
  adopting the bundling way of bundling continuous N sub-frames, N is a natural number, and the number and location of OFDM symbols utilized by each of the N sub-frames are the same; or, the N sub-frames are bundled at an interval of a designated number of sub-frames;
  when the bundling way of bundling continuous N sub-frames is adopted, N is one of the following numbers: 4, 8, 10, 16, 20, 30, 40, 50, 60, 80, 100, 200 and 400.

13. The method according to claim 10, characterized in that the sub-frames transmitted in the bundling way are determined by one of the following signalling-indicated ways:
  the sub-frames are indicated through a Main Information Block, MIB, message;
  the sub-frames are indicated through N bit carried in reserved sub-carriers on the two sides of a primary synchronization sequence or a secondary synchronization sequence, N is a natural number;

after a Radio Resource Control, RRC, connection is established, notifying the sub-frames by an RRC signalling; and the sub-frames are indicated through a signalling in a Random Access Channel, RACH, process.

14. The method according to claim 10, characterized in that determining the sub-frames transmitted in the bundling way according to a pre-defined way comprises:

when the control channel is an ePDCCH, determining the sub-frames in one of the following ways: transmitting all the bundled sub-frames on a same Physical Resource Block, PRB; implementing frequency hopping for the frequency domain locations of the repeated sub-frames with respect to the frequency domain location of the original sub-frame within a same set; and implementing frequency hopping for the frequency domain locations of the repeated sub-frames with respect to the frequency domain location of the original sub-frame within a different set; or determining the location of resources for the bundling transmission of the control channel comprises:

when the control channel is the ePDCCH, the ePDCCH is repeatedly transmitted on the enhanced Control Channel Element, eCCE, of a same index of respective bundled sub-frames;

the ePDCCH is transmitted repeatedly in a same index candidate set of a same PRB set of respective bundled sub-frames;

the ePDCCH is transmitted in a pre-defined aggregation level on a same eCCE in a PRB corresponding to respective bundled sub-frames, a same candidate set index existing in a same PRB set; and the ePDCCH is repeatedly transmitted on an eCCE corresponding to a same candidate set index in different PRB sets of respective bundled sub-frames.

15. The method according to claim 1, characterized in that the method for determining Cyclic Redundancy Check, CRC, corresponding to the data scheduled by the information carried in the control channel or the method for determining CRC corresponding to the information carried in the control channel comprises one of the following steps:

pre-defining a threshold X1, when the bit number of information of the transmission block is less than X1, CRC with A1 bits is added, when the bit number of information of the transmission block is not less than X1, CRC with A2 bit is added, wherein A1 and A2 are positive integers, and X1 is a natural number; and pre-defining two thresholds X1 and Y1, when the bit number of information of the transmission block is more than or equal to X1, CRC with B2 bits is added, when the bit number of information of the transmission block is more than or equal to Y1 and is less than X1, CRC with B2 bits is added, and when the bit number of information of the transmission block is less than Y1, CRC with B3 bits is added, wherein X1 and Y1 are both natural numbers and X1>Y1 wherein (A1, A2) is one of the following sets: (8, 16), (16, 24), (8, 24) and (4, 16); and/or (B1, B2, B3) is one of the following sets: (24, 16, 8) and (16, 8, 4).

16. A method for processing the transmission of a control channel, which is applied to a terminal, characterized by comprising:

acquiring indicating information for indicating a terminal type; and when the indicating information indicates that the terminal type is a first terminal type, detecting the control channel in multiple sub-frames, wherein a compact Downlink Control Information, DCI, format is utilized during repeated transmission of the same information over the control channel in the multiple sub-frames, and a hit domain indicating a repetition number of a service channel is added in the compact DCI format;

when the indicating information indicates that the terminal type is a second terminal type, detecting the control channel in a single sub-frame.

17. The method according to claim 16, characterized in that determining a type of the control channel in one of the following ways:

detecting a designated type of the control channel according to a bandwidth of an LTE system;

determining the detected designated type of the control channel according to a carrier type; and detecting the designated type of the control channel regularly.

18. The method according to claim 17, characterized in that the control channel comprises a PDCCH and an ePDCCH;

when the terminal type indicated by the indicating information is the first terminal type;

detecting the designated type of the control channel according to the bandwidth of the LTE system comprises: when the bandwidth is equal to a designated threshold, detecting the PDCCH, and when the bandwidth is larger than the designated threshold, detecting the ePDCCH;

detecting the designated type of the control channel according to the carrier type comprises: detecting the PDCCH by a compatible carrier and the ePDCCH by a non-compatible carrier;

detecting the designated type of the control channel regularly comprises: detecting the ePDCCH regularly;

when the terminal type indicated by the indicating information is the second terminal type;

detecting the designated type of the control channel according to the bandwidth of the LTE system comprises: when the bandwidth is equal to a designated threshold, detecting the PDCCH or the ePDCCH, and when the bandwidth is larger than the designated threshold, detecting the ePDCCH;

detecting the designated type of the control channel according to the carrier type comprises: detecting the PDCCH by a compatible carrier and the ePDCCH by a non-compatible carrier;

detecting the designated type of the control channel regularly comprises: detecting the PDCCH regularly, or detecting the ePDCCH regularly.

19. An apparatus for transmitting a control channel, which is applied to a network side device, characterized by comprising:

an acquisition component, configured to acquire indicating information for indicating a terminal type; and a transmission component, configured to, when the indicating information indicates that the terminal type is a first terminal type, transmit the control channel to the terminal with the first terminal type in multiple sub-frames, wherein a compact Downlink Control Information, DCI, format is utilized during repeated transmission of the same information over the control channel in the multiple sub-frames, and a bit domain indicating a repetition number of a service channel is added in the compact DCI format;

the transmission component is further configured to, when the indicating information indicates that the terminal type is a second terminal type, transmit the control channel to the terminal corresponding to the second terminal type in a single sub-frame.

20. An apparatus for processing the transmission of a control channel, which is applied to a terminal, characterized by comprising:
an acquisition component, configured to acquire indicating information for indicating a terminal type; and
a detection component, configured to, when the indicating information indicates that the terminal type is a first terminal type, detect the control channel in multiple sub-frames, wherein a compact Downlink Control Information, DCI, format is utilized during repeated transmission of the same information over the control channel in the multiple sub-frames, and a bit domain indicating a repetition number of a service channel is added in the compact DCI format;
the detection component is further configured to, when the indicating information indicates that the terminal type is a second terminal type, detect the control channel in a single sub-frame.

* * * * *